United States Patent [19]

Rollat et al.

[11] Patent Number: 4,726,938
[45] Date of Patent: Feb. 23, 1988

[54] LIQUID/LIQUID EXTRACTION/PURIFICATION OF IMPURE SOLUTIONS OF RARE EARTH VALUES

[75] Inventors: Alain Rollat, Paris; Jean-Louis Sabot, Maisons Laffitte; Michel Burgard, Strasbourg; Thierry Delloye, Villeparisis, all of France

[73] Assignee: Rhone-Poulenc Specialites Chimiques, Courbevoie, France

[21] Appl. No.: 819,060

[22] Filed: Jan. 15, 1986

[30] Foreign Application Priority Data

Jan. 15, 1985 [FR] France .................................. 85 00495

[51] Int. Cl.$^4$ ............................................. B01D 11/04
[52] U.S. Cl. .................................... 423/21.5; 423/157; 423/DIG. 14; 210/634; 210/643; 210/644
[58] Field of Search ........................ 210/634, 643, 644; 423/21.5, 157, DIG. 14

[56] References Cited

U.S. PATENT DOCUMENTS

| | | | |
|---|---|---|---|
| 3,258,315 | 6/1966 | Schmitt | 423/157 |
| 3,449,088 | 6/1969 | Lee | 423/157 |
| 4,092,117 | 5/1978 | Byrne | 210/644 |
| 4,474,738 | 10/1984 | Martin | 423/157 |

FOREIGN PATENT DOCUMENTS

2562059 4/1984 France .
2156795 10/1985 United Kingdom .

OTHER PUBLICATIONS

*Analytical Chemistry*, vol. 52, No. 6, May 1980, Fujita, H. et al, "Separation of Metal Salts by Insolubilized Noncyclic Poly(oxyethylene) Derivatives", pp. 869–875.
*Z. Anal. Chem.*, 284, 1977, Blasius, E. et al, pp. 337–360.
Journal of Membrane Science, vol. 17, No. 1, 1984, pp. 97–107, R. A. Bartsch et al; "Separation of Metals by Liquid Surfactant Membranes Containing Crown Ether Carboxylic Acids".
Journal of Membrane Science, vol. 11, No. 2, 1982, pp. 169–175, K. H. Pannell et al.; "Dibenzo-Crown Facilitated Transport Across a CHCL3 Liquid Membrane.".
Journal of Membrane Science, vol. 11, No. 2, 1982, pp. 157–168, Shoichiro Yoshida et al, "Kinetics of Partition between Aqueous Solutions of Salts and Bulk Liquid Membranes Containing Neutral Carriers".
Chemical Abstracts, vol. 87, No. 4, 1977, p. 309, ref. no. 27938v, Kimura, Toshimasa et al, "Separation of Strontium Ion from a Large Amount of Calcium Ion by the Use of a Macrocyclic Ether".
Chemical Abstracts, vol. 89, 1978, p. 671, ref. no. 156824v, W. Lada et al, "Separation of Alkaline Earth Metals by Extraction Chromatography with Dibenzo-18-Crown-6".
Chemical Abstracts, vol. 91, No. 4, 1979, p. 487, ref. no. 28109v, Takeda, Yasuyuki et al, "Separation of Barium (II) from Strontium (II) by Means of the Solvent Extraction with Dibenzo-24-Crown-8".
Chemical Abstracts, vol. 91, 1979, p. 745, ref. no. 67852b, W. Smulek et al, "Separation of Alkali and Alkaline Earth Metals by Polyethers Using Extraction Chromatography. Effect of Diluent".
Chemical Abstracts, vol. 91, No. 24, 1979, p. 429, ref. no. 199641s, Sekine, Tatsuya et al, "Solvent Extraction of Lead(II) and Strontium(II) as Dibenzo-18-Crown-6-Complexes with Picrate Ion".
Chemical Abstracts, vol. 92, No. 22, 1980, p. 638, ref. no. 190518v, Poonia, Narinder S. et al., "Ligation and Charge Separation of Alkali and Alkaline Earth Cations with Benzo-15-Crown-5".
Chemical Abstracts, vol. 98, 1983, ref. no. 118725s, p. 727, N. P. Aleksyuk et al, "Comparative Study of Solvent Extraction of Mixed Ligand Complexes of Metal Cations with Sulfophthalein Dyes".

Primary Examiner—Richard V. Fisher
Assistant Examiner—Jeffrey W. Peterson
Attorney, Agent, or Firm—Burns, Doane, Swecker & Mathis

[57] ABSTRACT

Aqueous nitric solutions of salts of at least one rare earth, and containing contaminating amounts of at least one alkaline earth cation, e.g., calcium, barium and/or radium, are conveniently purified by liquid/liquid extracting same with an organic phase which comprises a polyether extractant for said at least one alkaline earth cation, e.g., a crown ether, and whereby said at least one alkaline earth cation is selectively transferred into said organic phase.

32 Claims, 3 Drawing Figures

LIQUID/LIQUID EXTRACTION/PURIFICATION OF IMPURE SOLUTIONS OF RARE EARTH VALUES

BACKGROUND OF THE INVENTION

1. Field of the Invention

The present invention relates to the purification of aqueous nitric solutions of rare earth values, said solutions containing, inter alia, alkaline earth metal cations, and more especially relates to the purification of such solutions by liquid/liquid extraction.

By the expression "rare earths" as utilized herein are intended the rare earth elements designated the lanthanides, having atomic numbers from 57 to 71, inclusive, as well as yttrium, having an atomic number of 39.

2. Description of the Prior Art

It is known to this art that the rare earth metals are typically found combined in different minerals, such as monazite, bastnaesite, xenotime, or various concentrates thereof; one means to separate the different rare earths from each other consists of carrying out successive liquid/liquid extractions beginning with aqueous solutions of said rare earths.

It is necessary that such starting aqueous salt solutions be of sufficient purity as to not adversely affect the course of the extraction operations. Similarly, the different rare earths separated cannot be used in certain applications if they contain more than a very small amount of impurities and of radioactivity.

Among the metals accompanying the rare earths, in aqueous solutions of the salts thereof, there are found, in particular, thorium, uranium and various metals such as alkali metals, alkaline earth metals, iron, manganese, titanium, and the like.

Among the alkaline earth metals, the presence of calcium, barium and radium, a product of the filiation of thorium $Th^{232}$ and uranium $U^{238}$ is noted.

Usually, in order to obtain high purity rare earth elements, they are separated from the other metals by extraction in an organic phase containing suitable extraction agent.

In view of the fact that the rare earths are present in preponderant amounts, it would be more convenient to eliminate the impurities consisting of the "other" metallic elements.

But even though it is known to preferentially extract, by liquid/liquid extraction, certain metallic impurities, in particular iron, the problem of separating the rare earths from the alkaline earth metals by extraction of the latter has not as yet been solved.

SUMMARY OF THE INVENTION

Accordingly, a major object of the present invention is the provision of an improved process for the purification of aqueous solutions of salts of rare earths, said solutions containing at least one rare earth and at least one alkaline earth metal, and said improved process featuring liquid/liquid extraction between an aqueous phase containing the salts of said metals and an organic phase, characterized by the fact that an aqueous nitric phase containing one or several rare earths and one or several alkaline earth metals is contacted with an organic phase containing an extractant for alkaline earth metal cations and comprising at least one solvating agent of the polyether type.

DETAILED DESCRIPTION OF THE INVENTION

Figure 1:
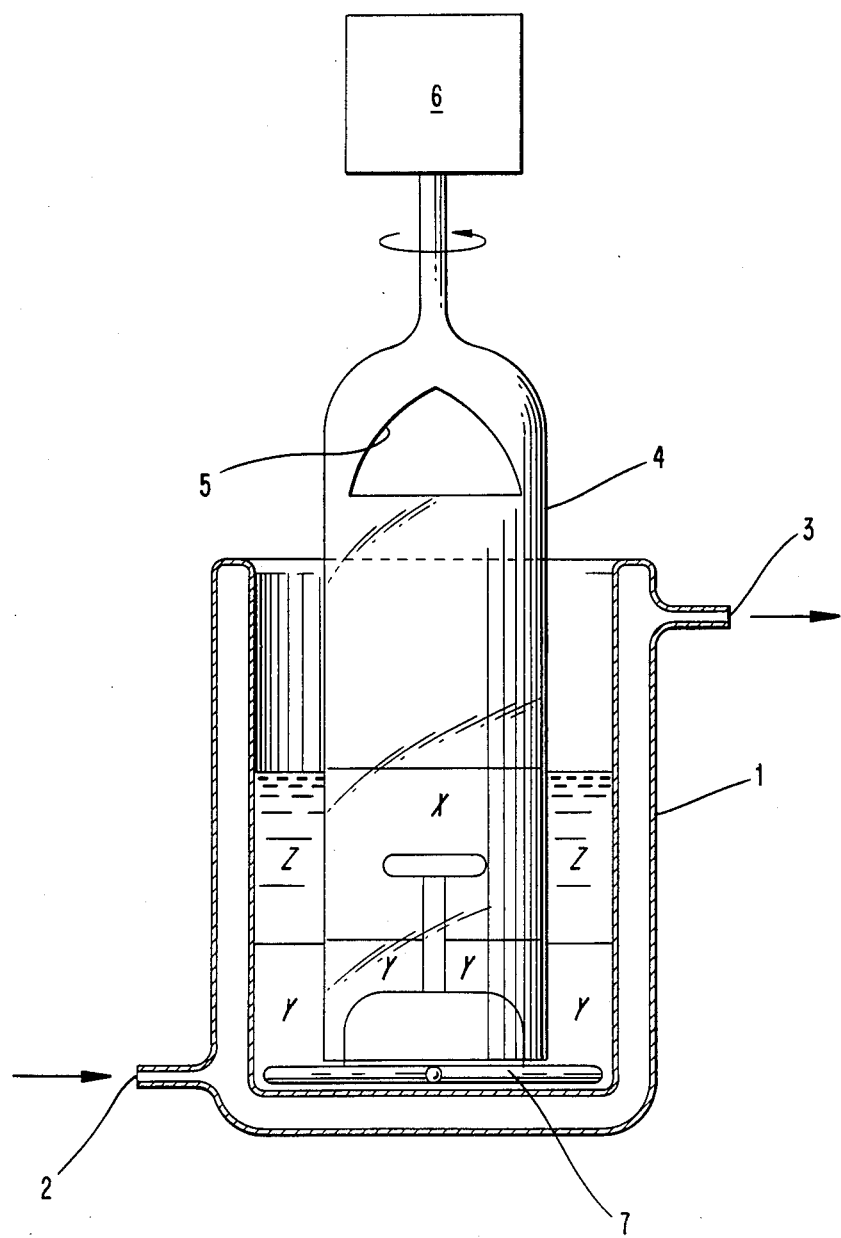
FIG. 1 is a cross-sectional view of ion transport apparatus suitable for carrying out the liquid/liquid extraction according to the invention.

More particularly according to the present invention, the rare earth cation is hereinafter designated simply as the "rare earth" and the alkaline earth metal cation $M^{2+}$ as the "alkaline earth".

The extraction agent, or extractant, according to the invention is advantageously a macrocyclic compound of the polyether type, typically designated a crown ether.

Said macrocyclic compound is characteristically a cyclic polyether having a basic cyclic structure containing from 6 to 60 carbon atoms and 3 to 20 oxygen atoms, with at least two oxygen atoms being attached to carbon atoms adjacent or not to an aromatic hydrocarbon ring and the other oxygen atoms being bonded to each other by means of hydrocarbon groups comprising at least two carbon atoms.

The cyclic polyethers according to the invention have the general formula (I):

(I)

wherein a ranges from 3 to 20, the symbol R represents a —$CH_2$—$CH_2$— or —$CH_2$—$CH_2$—$CH_2$— radical and at least one cyclic radical selected from among those of the formulae:

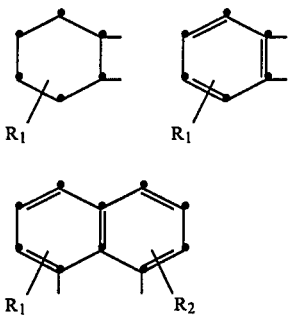

wherein $R_1$ and $R_2$, which may be identical or different, are each a hydrogen atom or one or more substituents, such as an alkyl radical having from 1 to 12 carbon atoms, a halogen atom, a nitro or hydroxy radical.

Among the compounds of the formula (I), those corresponding to formula (I) wherein a is from 5 to 10, are preferred, with R being as above defined and $R_1$ and $R_2$ representing a hydrogen atom and an alkyl radical having from 1 to 9 carbon atoms.

As specific examples of cyclic polyethers suitable for use according to the invention, those of the following groups are representative:

Group A: 15-C-5 to 18-C-5

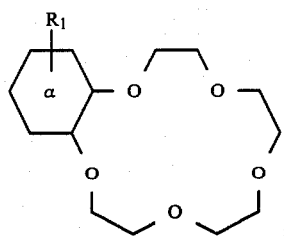
(II)

(in the formula (II), α represents a cyclohexyl, benzo, 2,3-naphtho, or 2,3-decalyl group, and $R_1$ represents a hydrogen atom or an alkyl radical having 1 to 9 carbon atoms).

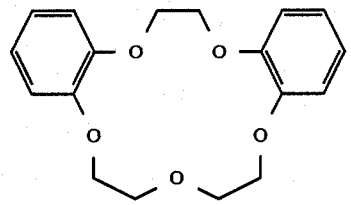

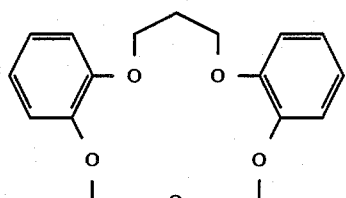

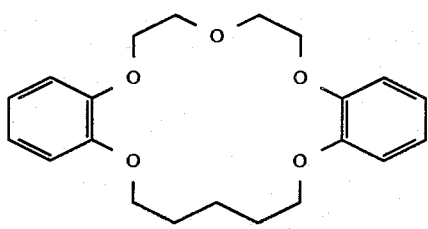

Group B: 18-C-6 to 19-C-6

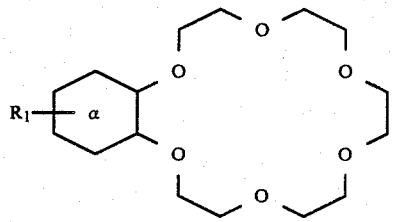
(III)

(in the formula (III), α represents a cyclohexyl, benzo, or 2,3-naphtho group, and $R_1$ represents a hydrogen atom or an alkyl radical having 1 to 9 carbon atoms).

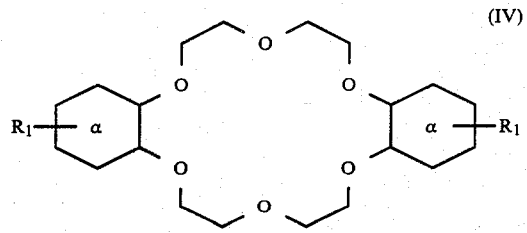
(IV)

(in the formula (IV), α represents a cyclohexyl, benzo, or 2,3-naphtho group, and $R_1$ represents a hydrogen atom or an alkyl radical having 1 to 9 carbon atoms).

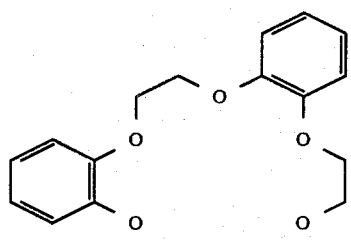

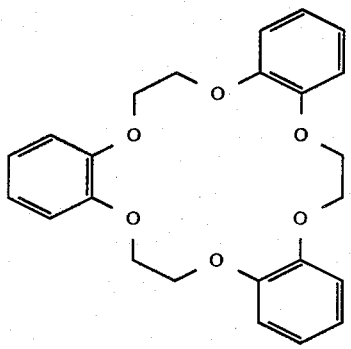

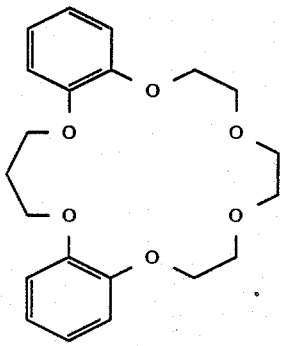

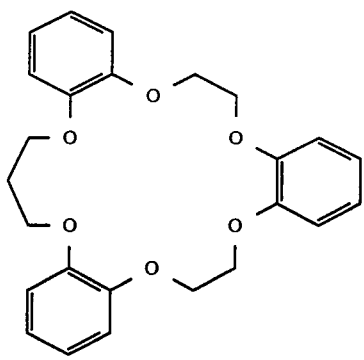

Group C: 21-C-7

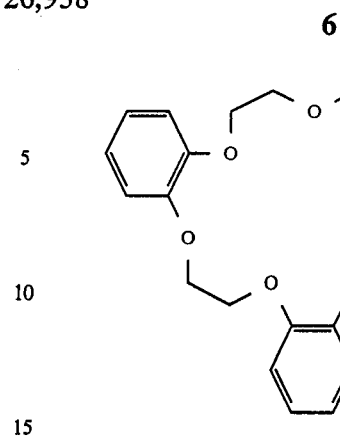

Group D: 24-C-8

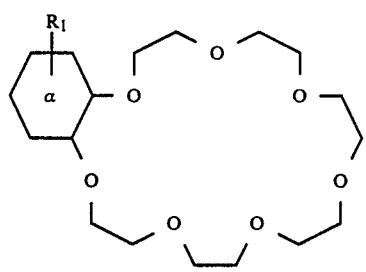
(V)

(in the formula (V), α represents a cyclohexyl, benzo or 2,3-naphtho group, and $R_1$ represents a hydrogen atom or an alkyl radical having 1 to 9 carbon atoms).

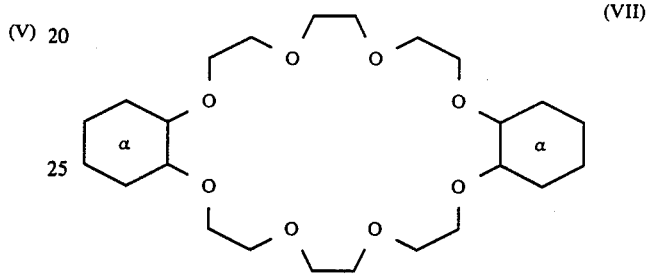
(VII)

(in the formula (VII), α represents a cyclohexyl, benzo or 2,3-naphtho group).

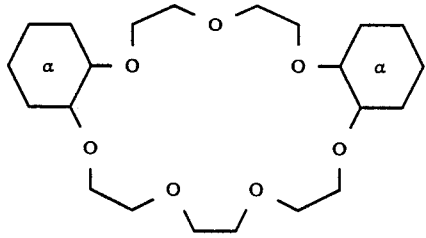
(VI)

(in the formula (VI), α represents a cyclohexyl or benzo group).

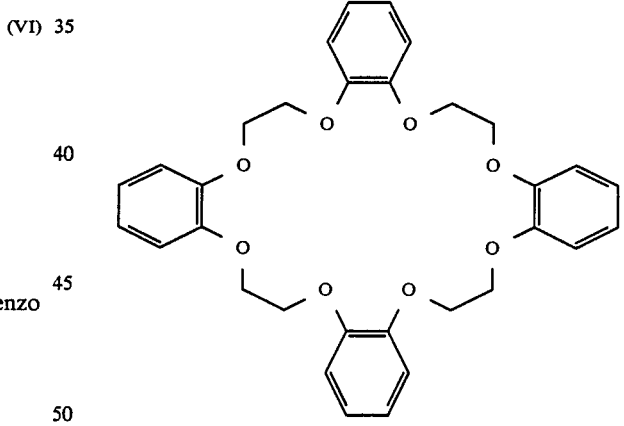

Group E: 30-C-10

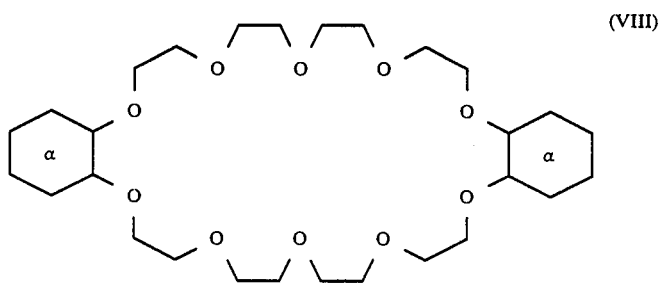
(VIII)

(in the formula (VIII), α represents a cyclohexyl or benzo group).

Even more preferably, the following macrocyclic compounds are used in the process of the invention:

(i) those corresponding to formula (III) wherein α represents a benzo group and $R_1$ a nonyl radical, commonly designated as 4-nonylbenzo-18-C-6;

(ii) those corresponding to formula (IV) wherein α represents a cyclohexyl or benzo group and $R_1$ a hydrogen atom, respectively designated as dicyclohexyl-18-C-6 and dibenzo-18-C-6;

(iii) those corresponding to formula (V) wherein α represents a benzo group and $R_1$ a nonyl radical, designated as 4-nonylbenzo-21-C-7;

(iv) those corresponding to formula (VI) wherein α represents a cyclohexyl group and $R_1$ a hydrogen atom, designated as dicyclohexyl-21-C-7;

(v) those corresponding to formula (VII) wherein α represents a cyclohexyl group and $R_1$ a hydrogen atom, designated as dicyclohexyl-24-C-8.

The preparation of the different types of macrocyclic compounds, such as those mentioned above, has been described in numerous publications. Compare, for example, the articles by Pederson, *J.A.C.S.*, 89, 7017 (1967) and *J.A.C.S.*, 89, 2495 (1967) and J. J. Christensen et al., *Chemical Reviews*, 74, 350 (1974).

The alkaline earth or earths extracted into the organic phase containing at least one solvating agent of the polyether type and an organic diluent may be recovered in the aqueous phase by means of a back- or re-extraction solution, thereby enabling the regeneration of the organic phase. The nature of the diluent and of the re-extraction solution will be specified later.

A preferred embodiment of the invention consists of carrying out the subject purification by liquid/liquid extraction, utilizing a liquid membrane.

More precisely, this preferred process for the purification of aqueous solutions of salts of rare earths and containing at least one rare earth and at least one alkaline earth, comprises:

(a) forming a liquid membrane with an organic phase containing at least one solvating agent of the polyether type;

(b) contacting one face surface of said membrane with the aqueous nitric phase containing one or several rare earths and one or several alkaline earths (said phase being designated as the feed solution); and (c) contacting the other face surface of the membrane with a re-extraction solution.

Preferably, a liquid membrane is used which is conveniently prepared by the impregnation of a porous membrane with an organic phase typically containing, in addition to the extraction agent, an organic diluent.

The criteria determining the selection of a porous membrane to be impregnated are the following:

(1) The porous membrane must be formed of a material that is chemically stable with respect to the aqueous phase containing the cations to be separated and the re-extraction solution. It must resist physically and chemically the organic phase forming the liquid membrane.

Conventional porous membranes, such as porous plastic membranes, porous metal or glass membranes, porous ceramic membranes or paper filter membranes may be used.

In a preferred embodiment of the invention, inert polymer membranes are used, such as polypropylene, polytetrafluoroethylene (P.T.F.E.), polydifluorovinylidene (P.V.D.F.), polyethylene, polysulfone or polyphenylene oxide.

The three first mentioned polymers are the initial materials of choice.

(2) The membrane must be highly porous and have fine and continuous pores. It is advantageous to use a membrane having a porosity of at least 10% and possibly extending up to 95%. In view of the fact that a compromise must be observed between the porosity, which should be the highest possible, and the mechanical strength, which must be good, a porous membrane having a pore volume of from 20 to 60% is preferably selected; the pore volume is measured using a mercury porosimeter at 2000 bars ($202.65 \times 10^6$ Pa).

(3) The porous membrane impregnated by the organic phase must have very fine pores in order to retain, by capillary action, the organic phase forming the liquid membrane. The average diameter of the pores preferably ranges from 0.01 to 5 μm. If the diameter of the pores is less than 0.01 μm, the complex formed has difficulty in circulating because the pores are too small. In the case of a pore diameter in excess of 5 μm, the organic phase is difficult to retain. Preferentially, a pore diameter of from 0.02 to 0.05 μm is selected.

(4) The membrane must consist of a material that is readily wetted by the organic phase and difficult to wet by the aqueous phases consisting of the feed solution and the re-extraction solution. In other words, the material must be hydrophobic and have a high surface tension to water, such that the water will not replace the organic phase impregnating the membrane.

(5) The membrane must be thin in order to favor the kinetics of the reaction. However, there is a lower limit to the thickness in view of the fact that an excessively thin membrane lacks mechanical strength and reduces the retention of the organic phase. Preferably, a membrane having a thickness of from 50 to 700 μm and even more preferably from 50 to 500 μm, is used.

The porous membrane is impregnated with the organic phase containing the extraction agent and an organic diluent.

The organic diluent is not miscible with the feed solution, or is only slightly soluble therein, but it must be able to dissolve the complex formed between the extractant and the $M^{2+}$ alkaline earth cations: magnesium, calcium, strontium, barium, radium.

Examples of the organic diluent suitable for use according to the invention are: aromatic hydrocarbons, such as, for example, benzene, toluene, ethylbenzene, xylene and petroleum cuts of the Solvesso type (trademark of the EXXON Co.), in particular Solvesso 100 which essentially consists of a mixture of methylethyl and trimethylbenzene and Solvesso 150 which comprises a mixture of alkylbenzenes, in particular dimethylethylbenzene and tetramethylbenzene; halogenated hydrocarbons, such as chloroform, methylene chloride, 1,2-dichloroethane, 1,1-dichloroethane, carbon tetrachloride, 1,1,2,2-tetrachloroethane, 1,1,1,2-tetrachloroethane, chlorobenzene, 2-chlorotoluene, 3-chlorotoluene, 4-chlorotoluene, 1-chloroethylbenzene, 1-chloro-2,4-dimethylbenzene, 1-chloro-3,5-dimethylbenzene, 2-chloro-1,4-dimethylbenzene, 4-chloro-1,2-dimethylbenzene, 2-chloro-1,3,5-trimethylbenzene, 1,2-dichlorobenzene, 1,3-dichlorobenzene, 1,3-dichlorobenzene, 1,4-dichlorobenzene, 1,2-bis(chloromethyl)-benzene, 1,3-bis(chloromethyl)-benzene, 1,4-bis(chloromethyl)-benzene, 1-chloro-2-fluorobenzene, 1-chloro-4-fluorobenzene, 1-chloro-2-nitrobenzene, 1-chloro-3-nitrobenzene, 1-chloro-4-nitrobenzene, 1-bromo-2-chlorobenzene, 1-bromo-3-chlorobenzene, 1-bromo-4- chlorobenzene, 1-bromo-2,3-dichlorobenzene, 1-bromo-3,5-dichlorobenzene, 2-bromo-1,3-dichlorobenzene, 2-bromo-1,4-dichlorobenzene, 4-bromo-1,2-dichlorobenzene, 1-chloro-2,3-dihydroxybenzene, 1-chloro-2,4-dihydroxybenzene, 1-chloro-3,5-dihydroxybenzene, 2-chloro-1,3-dihydroxybenzene, 2-chloro-1,4-dihydroxybenzene, 4-chloro-1,2-dihydroxybenzene, 1-chloro-2,3-dimethyl-4-hydroxybenzene and isomers, 1,2-dichloro-4,5-dihydroxybenzene, 1,3-dichloro-2,5-dihydroxybenzene, 1,4-dichloro-2,5-dihydroxybenzene, 1,5-dichloro-2,3-dihydroxybenzene, 1,5-dichloro-2,4-dihydroxybenzene, 2,3-dichloro-1,4-dihydroxybenzene, 1-bromo-4-tert-butylbenzene. It is also possible to use heavy alcohols having 4 to 12 carbon atoms, butanol to dodecanol, or other aromatic solvents, such as the nitrobenzenes or phenols and diphenols, such as, for example, phenols, cresols, trimethylphenols, hydroquinone, pyrocatechol, resorcinol, or the nitrophenols.

A mixture of diluents may also be employed.

The concentration of the extractant in the organic diluent is not a critical factor according to the invention. Obviously, the highest possible concentrations are sought. In the case of the use of a crown ether, it ranges from about $10^{-3}$ mole/liter to 2 moles/liter.

The porous membrane impregnated with the organic phase described above is contacted, on the one side, with the feed solution containing the cations to be separated and, on the other, with the back- or re-extraction solution.

The feed solution may consist of an aqueous solution originating from the redissolution, with nitric acid, of hydroxides obtained in the sodium hydroxide digestion of minerals containing rare earths, such as monazite, bastnaesite and xenotime. It is also possible to use any other solution of rare earths, after exchanging the anion present into the nitrate anion.

The process of the invention may be applied to the solutions as such, or after a preliminary concentration thereof.

Generally, the liquid/liquid extraction is carried out on aqueous nitric solutions containing rare earths and having a concentration, expressed as the oxides of the rare earths, ranging from 20 g/l to 500 g/l. It is preferable to carry out the operation using the most highly concentrated solutions possible: a concentration ranging from 100 g/l to 500 g/l is preferably selected. They display an acidity which is not critical and generally varies from 0.01 to 3.0 N.

The re-extraction solution is not miscible with the organic phase, or is only slightly soluble therein. Generally, water or an aqueous solution of a complexing agent forming a soluble or insoluble complex with alkaline earth cations is used.

It is possible to employ inorganic complexing agents, such as sodium or potassium orthophosphates, or pyrophosphates, or sodium sulfate, or organic complexing agents, more particularly aminopolyacetic acids (or their salts), such as, for example:
(i) N-hydroxyethylethylenediaminetriacetic acid (H.E.D.T.A.),
(ii) ethylenediaminetetraacetic acid (E.D.T.A.)
(iii) diaminocyclohexanetetraacetic acid (D.C.T.A.),
(iv) diethylenetriaminopentaacetic acid (D.T.P.A.),
(v) triethylenetetraminohexaacetic acid (T.T.H.A.).

The concentration of the complexing agent in the re-extraction solution may vary, without disadvantage, from $10^{-3}$ to 1 mole/liter and preferably ranges from $10^{-2}$ and $10^{-1}$ mole/liter.

The principle of extraction utilizing a crown ether according to a preferred embodiment of the invention will now be set forth briefly below.

The feed solution is placed in contact with the organic phase defining the liquid membrane.

Reaction (1) takes place at the interface:

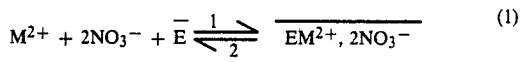

The complex formed between the alkaline earth cation and the crown ether E diffuses through the liquid membrane and reached the other interface where it is contacted with the re-extraction solution.

The metallic cation $M^{2+}$ is extracted into the re-extraction solution: the Reaction (1) is displaced in the direction 2.

The crown ether retrodiffuses to the first interface of the liquid membrane.

The cation $M^{2+}$ is extracted into the re-extraction solution. If a complexing agent is added to said solution, Reaction (1) is displaced in the direction 2, which facilitates the re-extraction of the $M^{2+}$ ion.

In a practical manner, the transfer of the alkaline earth cations through the membrane is effected at temperatures ranging from 10° to 80° C. It is preferred to operate at a room temperature on the order of 15° to 25° C.

The flow rate of the aqueous phase depends upon numerous factors, which are:
(a) the concentration of the alkaline earth cations in the feed solution,
(b) the degree of purity desired,
(c) the surface of the porous membrane provided.

It is also related to the geometry of the apparatus and must be determined individually in each case.

The process of the invention is carried out in known apparatus.

It is possible to use cells having flat membranes, or modules provided with hollow fibers. For further details, reference is made to the literature and in particular to the French patent application published under No. 2,451,764, or to U.S. Pat. No. 4,051,230. It is mentioned that it is preferable to use hollow fibers as the membrane structure, in view of their surface/volume ratio, which is much more favorable than in the case of a flat membrane, or one in the form of a rod. Hollow fibers having, for example, an internal diameter of from 0.125 to 2.5 mm and a thickness on the order of 50 to 500 $\mu$m, are suitable.

It should be appreciated that the process of the invention is well adopted for the elimination of calcium, barium and radium $Ra^{228}$ and $Ra^{226}$ contained in aqueous solutions resulting from the nitric redissolution of rare earth hydroxides, obtained via the sodium hydroxide of minerals comprised thereof.

In order to further illustrate the present invention and the advantages thereof, the following specific examples are given, it being understood that same are intended only as illustrative and in nowise limitative.

EXAMPLES 1 TO 4

Purification of an aqueous solution of lanthanum nitrate containing different alkaline earths:

The extraction of the alkaline earth ions was carried out using a thick liquid membrane.

The ion transport cell shown in FIG. 1 was used.

The cell consisted of a cylindrical chamber 1 having an internal diameter of 8 cm and provided with double walls, in the interspace between which water was circulated at 25° C. and entered through the line 2 and exited via the line 3.

A cylindrical glass bell 4 having a diameter of 5 cm was inserted into the chamber 1. The bell was provided at its upper end region with an orifice 5 which enabled the introduction of the aqueous feed phase.

A synchronous motor 6 rotated the cylindrical bell at a constant velocity of 200 rpm.

A stationary mixer 7 was placed at the bottom of the cell.

Into the cylindrical chamber 1, 150 cm³ of an organic phase Y were introduced; it contained as the solvating agent a crown ether, dicyclohexyl-18-C-6 (DC-18-C-6), the concentration of which is reported for each example in Table I, and a diluent which was chloroform.

40 cm³ of an aqueous nitric feed phase X, the composition of which is also reported in Table I, were introduced through the orifice 5 and simultaneously, on the outside of the bell 4, 100 cm³ of a re-extraction solution Z were introduced, said solution Z consisting of dionized water.

The organic phase Y was located between the aqueous feed phase X and the re-extraction solution Z, and thereby formed the liquid membrane.

The synchronous motor 6 was actuated and the rotation of the glass bell 4 initiated. The bell homogenized the phases by its rotation, while maintaining the interface flat.

The aqueous feed phase X/liquid membrane Y interface had a surface area of 15.9 cm² and the liquid membrane Y/re-extraction solution Z a surface area of 30.7 cm².

A temperature of 25° C. was maintained throughout the extraction.

After 7 hours, the quantity of the alkaline earth and rare earth cations transferred from the feed phase Z to the re-extraction phase Z was determined. The alkaline earths were determined by atomic absorption flame spectrophotometry and that of the rare earths by X ray fluorescence.

The results obtained are reported in Table I.

TABLE I

| Example | Aqueous feed phase X | Liquid membrane Y | Aqueous re-extraction solution Z | % $M^{2+}$ transferred in 7 hours | % $La^{3+}$ transferred in 7 hours |
|---|---|---|---|---|---|
| 1 | $Ca(NO_3)_2$ 0.02 M $La(NO_3)_3$ 0.33 M | DC-18-C-6 0.01 M CHCl₃ | water | 68 | less than 0.1 |
| 2 | $Sr(NO_3)_2$ 0.02 M $La(NO_3)_2$ 0.17 M | DC-18-C-6 0.001 M CHCl₃ | water | 73 | less than 0.1 |
| 3 | $Sr(NO_3)_2$ 0.02 M $La(NO_3)_3$ 0.33 M | DC-18-C-6 0.001 M CHCl₃ | water | 93 | less than 0.1 |
| 4 | $Ba(NO_3)_2$ 0.02 M $La(NO_3)_3$ 0.33 M | DC-18-C-6 0.001 M CHCl₃ | water | 82 | less than 0.1 |

EXAMPLES 5 TO 10

Purification of an aqueous solution of samarium nitrate containing strontium:

The extraction of strontium was carried out using a flat liquid membrane obtained by the impregnation of a porous support.

Figure 2:
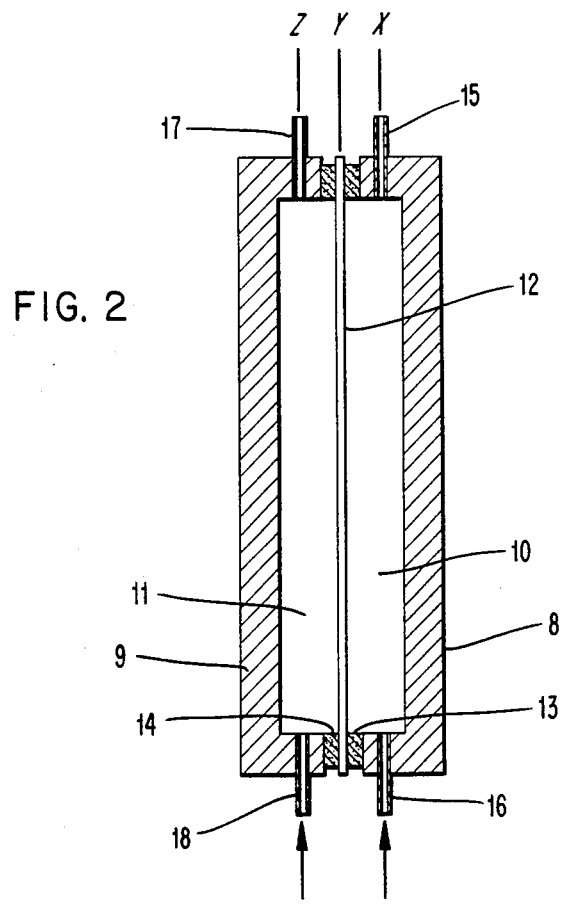
FIG. 2 is a cross-sectional view of another ion transport cell suitable for carrying out the liquid/liquid extraction according to the invention.

The transfer cell shown in FIG. 2 was used; it consisted of two compartments 8 and 9 of polyvinylchloride. The compartments define two parallelepipedic cavities 10 and 11 (92 mm×75 mm×10 mm), with a porous membrane 12 impregnated with the organic phase prior to its introduction, extending between them. The surface area of the membrane was 69 cm². Two gaskets 13 and 14, placed onto the periphery of the membrane, assured the tightness of the assembly.

An orifice was provided both on the top and at the bottom of each compartment and permitted the circulation of the aqueous phases.

The aqueous feed phase X which entered the cavity 10 through the line 16 and exited therefrom through the line 15, circulated in a closed loop, by means of a pump, at a rate of 20 liters/hr. It contained samarium nitrate and strontium nitrate in the concentrations reported in Table II. 150 cm³ of the aqueous phase X were used in the different experiments.

The liquid membrane Y was obtained by impregnation of a porous membrane.

The porous membranes used were those membranes marketed under the trademark Goretex by the W. L. Gore Co. and under the trademark Celgard by the Celanese Co.

The following membranes were used:

(a) Goretex L 104 16: this was a porous membrane of P.T.F.E. on a nonwoven propylene support, having an average pore diameter of 0.5 μm and a pore volume of 84%;

(b) Goretex L 111 17: this was a porous membrane having the above chemical composition, but having an average pore diameter of 0.02 μm and a pore volume of 50%;

(c) Celgard 2 500: a porous polypropylene membrane having a pore diameter of 0.02 μm and a pore volume of 38%;

(d) Celgard 4 510: a reinforced polypropylene porous membrane having a pore diameter of 0.02 μm and a pore volume of 38%;

The porous membrane used was impregnated with an organic phase containing a crown ether, dicyclohexyl-18-C-6 (DC-18-C-6) or 4-nonylbenzo-18-C-6 (N-4 B-18-C-6), and a diluent, the nature of which is reported in Table II.

The concentration in the crown ether of the organic phase is also reported in Table II.

The re-extraction solution Z, which entered through the line 18 into the cavity 11 and exited therefrom through the line 17, also circulated in a closed loop at a rate of 20 liters/hr. 150 cm³ of the re-extraction solution were used; it consisted either of deionized water, or water containing E.D.T.A. as a complexing agent.

The velocity of the transfer of the $Sr^{2+}$ cations per unit surface, expressed in $M \times cm^{-2} s^{-1}$, was determined by performing successive analyses of the re-extraction solution for a period of 8 hours.

The results obtained are reported in Table II.

TABLE II

| Example No. | Aqueous feed phase X | Microporous support 12 | Liquid membrane Y | Aqueous re-extraction solution Z | Flow of $Sr^{2+}$ | Proportion $\frac{\% Sr^{2+}}{\% Sm^{3+}}$ transferred in 8 hr |
|---|---|---|---|---|---|---|
| 5 | $Sr(NO_3)_2$ 1 M $Sm(NO_3)_3$ 1 M | Goretex L 104 16 | DC-18-C-6 0.1 M $C_2H_2Cl_4$ | $H_2O$ | $4.5 \cdot 10^{-9}$ | |
| 6 | $Sr(NO_3)_2$ 1 M $Sm(NO_3)_3$ 1 M | Goretex L 111 17 | DC-18-C-6 0.1 M $C_2H_2Cl_4$ | $H_2O$ | $1.7 \cdot 10^{-9}$ | 47.5 |
| 7 | $Sr(NO_3)_2$ 0.004 M $Sm(NO_3)_3$ 0.33 M | 2 supports Goretex L 111 17 | DC-18-C-6 0.1 M $C_2H_2Cl_4$ | $H_2O$ | $0.44 \cdot 10^{-9}$ | 184 |
| 8 | $Sr(NO_3)_2$ 1 M $Sm(NO_3)_3$ 1 M | Celgard 2 500 | N-4 B-18-C-6 0.1 M Solvesso 150 | $H_2O$ | $0.06 \cdot 10^{-9}$ | >15 |
| 9 | $Sr(NO_3)_2$ 1 M $Sm(NO_3)_3$ 1 M | Celgard 4 510 | N-4 B-18-C-6 0.1 M Solvesso 150 | EDTA (0.1 M) NaOH (0.1 M) | $0.18 \cdot 10^{-9}$ | >30 |

EXAMPLE 10

Purification of an aqueous nitric solution of rare earths containing radium:

The purification process was carried out in a hollow fiber module of the type shown in the first figure of the French patent application published under No. 2,451,764.

The module comprised 3,000 microporous polytetrafluoroethylene fibers having an average internal diameter of 0.75 mm to 1 mm and a length of 150 cm. The fibers had pores having an average internal diameter of 0.01 μm and a pore volume of 50%.

The aqueous nitric feed phase was a solution having a concentration, expressed in rare earth oxides, of 500 g/l, with the oxides distributed as follows:

$La_2O_3$ = 23%
$CeO_2$ = 46.5%
$Pr_6O_{11}$ = 5.1%
$Nd_2O_3$ = 18.4%
$Sm_2O_3$ = 2.3%
$Eu_2O_3$ = 0.07%
$Gd_2O_3$ = 1.7%
$Y_2O_3$ + 2%
other rare earths = 0.93%

The said aqueous phase also contained $1.6 \times 10^{-8}$ g/liter of radius $Ra^{228}$ and $3.5 \times 10^{-7}$ g/liter of radium $Ra^{226}$.

The liquid membrane was prepared by the impregnation of the hollow fibers with an organic phase consisting of a crown ether, dicyclohexyl-21-C-7, in solution in tetrachloroethane, in a concentration of 0.1 M.

The re-extraction solution was deionized water.

In the module containing the impregnated fibers, 50 liters of the aqueous nitric phase were circulated in a closed loop at a rate of 1500 cm/min outside said fibers and simultaneously 50 liters of water inside the fibers at the same rate.

After 5 hours, the radium $Ra^{228}$ concentration of the rare earths was only $1.6 \times 10^{-10}$ g/liter and that of radium $Ra^{226}$ only $3.5 \times 10^{-9}$ g/liter.

EXAMPLE 11

Figure 3:
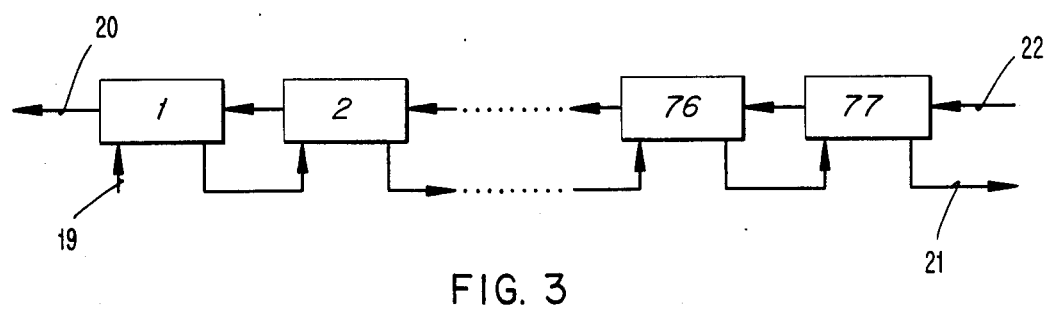
FIG. 3 is a flow diagram of one embodiment of liquid/liquid extraction according to the invention.

Continuous purification of a nitric solution of rare earths containing radium:

This example was carried out according to the flow diagram shown in FIG. 3.

The apparatus comprised a series of 77 modules of the type used in Example 10.

The hollow fibers were impregnated with an organic phase consisting of a dicyclohexyl-21-C-7 crown ether at a concentration of 0.1 M, in tetrachloroethane.

The aqueous nitric feed phase was the same as in Example 10.

The re-extraction solution was deionized water.

At the inlet of the first module, the aqueous nitric phase was introduced through the line 19 at a rate of 500 l/hr.

Simultaneously, deionized water was introduced through the line 22 at a rate of 200 l/hr.

At the outlet of the last module, through the line 21, the aqueous nitric phase of rare earths was collected; it contained only $1.6 \times 10^{-11}$ g/l of radium $Ra^{228}$ and $3.5 \times 10^{-10}$ g/l of radium $Ra^{226}$ and through the line 20, the re-extraction solution containing $4 \times 20^{-8}$ g/l of radium $Ra^{228}$ and $8.7 \times 10^{-7}$ g/l of radium $Ra^{226}$ was recovered.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of an aqueous nitric solution of salts of at least one rare earth, said solution containing contaminating amounts of at least one alkaline earth cation, comprising liquid/liquid extracting such aqueous nitric solution with an organic phase which comprises a polyether extractant for said at least one alkaline earth cation, and whereby said at least one alkaline earth cation is selectively transferred into said organic phase.

2. The process as defined by claim 1, said organic phase comprising an organic diluent and a macrocyclic polyether extractant.

3. The process as defined by claim 2, said organic diluent comprising an aromatic hydrocarbon or other aromatic solvent, a halogenated hydrocarbon, a heavy alcohol, or mixture thereof.

4. The process as defined by claim 3, said organic diluent comprising a halogenated hydrocarbon.

5. The process as defined by claim 3, said organic diluent comprising chloroform or a tetrachloroethane.

6. The process as defined by claim 2, said macrocyclic polyether extractant comprising a crown ether.

7. The process as defined by claim 6, the concentration of said crown ether in said organic diluent ranging from $10^{-3}$ mole/liter to 2 moles/liter.

8. The process as defined by claim 1, said polyether extractant comprising a cyclic polyether having from 6 to 60 carbon atoms and 3 to 20 oxygen atoms, at least two of the oxygen atoms of which may be bonded to carbon atoms adjacent an aromatic hydrocarbon ring and the other oxygen atoms of which are linked through hydrocarbon radicals containing at least two carbon atoms.

9. The process as defined by claim 8, said cyclic polyether having the general formula:

$$+R-O)_{\overline{a}}\quad (I)$$

wherein a ranges from 3 to 20, R is $-CH_2-CH_2-$, $-CH_2-CH_2-CH_2-$ or one of the cyclic radicals of the formulae:

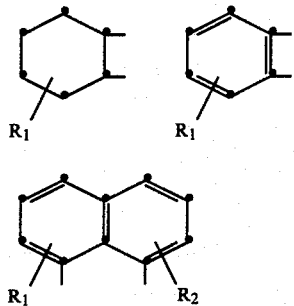

wherein $R_1$ and $R_2$, which may be identical or different, are each hydrogen, or at least one alkyl radical having from 1 to 12 carbon atoms, or at least one halo, nitro or hydroxy group, and further wherein at least one R moiety is a said cyclic radical.

10. The process as defined by claim 9, wherein said cyclic polyether a ranges from 5 to 10, and $R_1$ and $R_2$ are either hydrogen or an alkyl radical having from 1 to 9 carbon atoms.

11. The process as defined by claim 1, said polyether extractant comprising 4-nonylbenzo-18-C-6, dicyclohexyl-18-C-6, dibenzo-18-C-6, 4-nonylbenzo-21-C-7, dicyclohexyl-21-C-7 or dicyclohexyl-24-C-8.

12. The process as defined by claim 1, said aqueous nitric solution having a concentration or rare earth values, expressed as the oxides thereof, ranging from 20 g/l to 500 g/l.

13. The process as defined by claim 12, said aqueous nitric solution having an acidity ranging from 0.01 N to 3.0 N.

14. The process as defined by claim 1, further comprising re-extracting said organic phase with water, or an aqueous solution of a complexing agent for said at least one alkaline earth cation.

15. The process as defined by claim 14, further comprising re-extracting with an aqueous solution of a complexing agent which comprises sodium or potassium orthophosphate or pyrophosphate, sodium sulfate, or an aminopolyacetic acid or salt thereof.

16. The process as defined by claim 15, said complexing agent comprising ethylenediaminetetraacetic acid or salt thereof.

17. The process as defined by claim 15, the concentration of said complexing agent in said aqueous solution ranging from $10^{-3}$ to 1 mole/liter.

18. The process as defined by claim 14, comprising re-extracting said organic phase with deionized water.

19. The process as defined by claim 14, said liquid/liquid extraction being carried out at the interface of a liquid membrane comprised of said organic phase, and including contacting of one face surface of said liquid membrane with said aqueous nitric solution and the other face surface thereof with said aqueous re-extraction phase.

20. The process as defined by claim 19, said liquid membrane comprising a porous membrane support impregnated with said organic phase.

21. The process as defined by claim 20, said porous membrane having a thickness of from 50 to 700 μm.

22. The process as defined by claim 21, said porous membrane having a thickness of from 50 to 500 μm.

23. The process as defined by claim 20, said porous membrane comprising hollow fibers.

24. The process as defined by claim 20, said porous membrane comprising polypropylene, polytetrafluoroethylene, polydifluorovinylidene, polyethylene, polysulfone or polyphenylene oxide.

25. The process as defined by claim 20, said porous membrane having a pore volume of from 10 to 95%.

26. The process as defined by claim 25, said porous membrane having a pore volume of from 20 to 60%.

27. The process as defined by claim 25, the pores of said porous membranes having an average diameter ranging from 0.01 to 5 μm.

28. The process as defined by claim 27, said average diameter ranging from 0.02 to 0.5 μm.

29. The process as defined by claim 1, carried out at a temperature ranging from 10° to 80° C.

30. The process as defined by claim 1, carried out at room temperature.

31. The process as defined by claim 19, comprising simultaneously contacting said respective face surfaces of said liquid membrane with said aqueous nitric solution and said aqueous re-extraction phase.

32. The process as defined by claim 1, said at least one alkaline earth cation comprising calcium, barium, radium or mixture thereof.

* * * * *